United States Patent [19]

Presley

[11] 4,385,674
[45] May 31, 1983

[54] LOAD SENSING POWER STEERING SYSTEM

[76] Inventor: Glen T. Presley, 403 W. Stocker, Angola, Ind. 46703

[21] Appl. No.: 217,399

[22] Filed: Dec. 17, 1980

[51] Int. Cl.$^3$ ............................................. B62D 5/08
[52] U.S. Cl. .................................... 180/132; 60/422
[58] Field of Search ................. 180/141, 132; 60/384, 60/422, 420

[56] References Cited

U.S. PATENT DOCUMENTS

| | | | |
|---|---|---|---|
| 3,662,548 | 5/1972 | Suzuki et al. | 60/422 |
| 3,979,908 | 9/1976 | Alderson | 60/422 |
| 4,043,419 | 8/1977 | Larson | 180/132 |

*Primary Examiner*—John A. Pekar
*Attorney, Agent, or Firm*—Edwin H. Crabtree

[57] ABSTRACT

A fluid control system for actuating a conventional power steering unit including a priority valve. The priority valve includes an inlet chamber connected to a pressure source, a priority outlet chamber connected to the steering unit, and a secondary outlet chamber connected to a secondary motor. The priority valve includes a valve spool slidable in a bore. One end of the bore with the spool forms a servo chamber which has a compression spring which urges the spool in one direction, and the other end of the bore and spool forms a servo chamber which acts in opposition to the first servo chamber. Each servo chamber is connected to the inlet pressure through an orifice in the valve spool which results in a rapid response time for moving the valve spool since the fluid travels only a short distance and since the fluid circulates it remains hot. There is a small logic control circuit flow across the priority valve and the steering valve for the steering unit. The logic flow passes across an orifice in the valve spool into the servo chamber with the compression spring, then across a second orifice before it flows into the steering flow downstream of a variable orifice in the steering valve. By reason of the two orifices in series, the spool of the priority valve can use a lower spring rate since a majority of the pressure drop will be taken downstream of the steering unit variable orifice.

10 Claims, 4 Drawing Figures

LOAD SENSING POWER STEERING SYSTEM

BACKGROUND OF THE INVENTION

The present invention relates to supplying power steering systems from a common pressure source and more specifically the application of a priority flow valve in a load sensing hydraulic system which provides priority flow to the steering circuit. In modern variable displacement hydraulic systems it quite often becomes necessary to provide an order of priority for the pump output capacity since the pump can not supply all of the circuits of the system with their maximum flow requirements at the same time.

For example, the power steering circuit of a mobile hydraulic system must have priority over the other circuits to avoid an obviously dangerous situation. In the past, most power steering systems have been supplied by a small independent pump which supplies only the needs of the steering system. However, in the interest of economics, some modern systems have taken the hydraulic pressure for steering from a large single pump which supplies all of the other hydraulic functions of the machine. A system of this type requires some form of priority flow to the steering unit. Two systems of this type are shown in U.S. Pat. No. 3,979,908 issued to Alderson, and U.S. Pat. No. 4,043,419 issued to Larson. Both of these patents teach priority flow control valves which are practically identical in function and structure. In both valves, to effect a movement of the valve spool, and adjust the priority flow, oil must backflow from the steering unit back to the servo chamber of the priority valve which quite often can be 15 to 20 feet. The response time of both of these valves is too slow due to a variety of reasons. Not only is there a long traveling distance, but the oil is cold and the size of orifice 52 in the Alderson patent and 57 in the Larson patent restrains its movement. If the orifice sizes in these two above-mentioned patents are increased, the stability of the valve decreases and the performance of the valve is unacceptable. In colder climates, the oil in this long sensing line remains very cold and thick since the oil in the line is basically stagnate.

Another disadvantage of the Alderson and Larson valves is the fact that spring 55 of Larson and 32 of Alderson must control the total pressure drop across the steering unit, therefore when the valves are standing by in a neutral condition, the priority valves will maintain a pump standby pressure which is fairly high and energyconsuming.

DESCRIPTION OF THE PRESENT INVENTION

The priority flow control valve of the present invention has a very similar application to the above-mentioned two patents, however, its performance characteristics are far improved. The valve has utility in not only modern pressure flow compensated variable displacement systems, quite often referred to as load-reponsive, but also in conventional fixed displacement systems. The valve spool in the present invention has a much quicker response time than the two above-mentioned patents because the valve spool is moved by oil traveling directly from the inlet of the priority valve through the valve spool into the servo chamber rather than backflowing that long distance from the steering unit through the sensing line to the servo chamber of the valve. The oil not only travels a very short distance from the pressure side of the priority valve, but also the oil is hot since it is circulating, all of which lends to a very rapid response time for moving the valve spool. The valve of the present invention has a small logic circuit flow across the priority valve to the steering unit at all times regardless of what the steering unit is doing. This logic flow passes across a first orifice in the valve spool before entering the servo chamber at the spring end of the priority valve and then across a second smaller restriction before it flows into the steering flow downstream of the variable orifice of the turning valve. By reason of these two orifices in series, the spool of the priority valve can use a lower spring rate since a majority of the pressure drop across the steering unit's variable orifice will be taken downstream of the priority valve servo chamber as will be defined in detail following hereafter.

It is therefore the principal object of the present invention to provide a priority flow control valve in a load sensing system which permits secondary flow so long as the priority flow requirements are satisfied or restricts the priority flow if the priority function tends to overspeed.

Another object of the present invention is to provide a priority flow control valve which has unlimited utility for use in open or closed center hydraulic systems, as well as pressure and flow compensated variable displacement systems or fixed displacement systems.

Another object of the present invention is to provide a priority flow control valve which has a rapid response time and a very low neutral standby pressure.

Another object of the present invention is to provide a priority flow control valve which is controlled by oil in sensing lines which moves in only one direction.

The preferred embodiments of the invention are described herein in detail with reference to the accompanying drawings in which.

Figure 1:
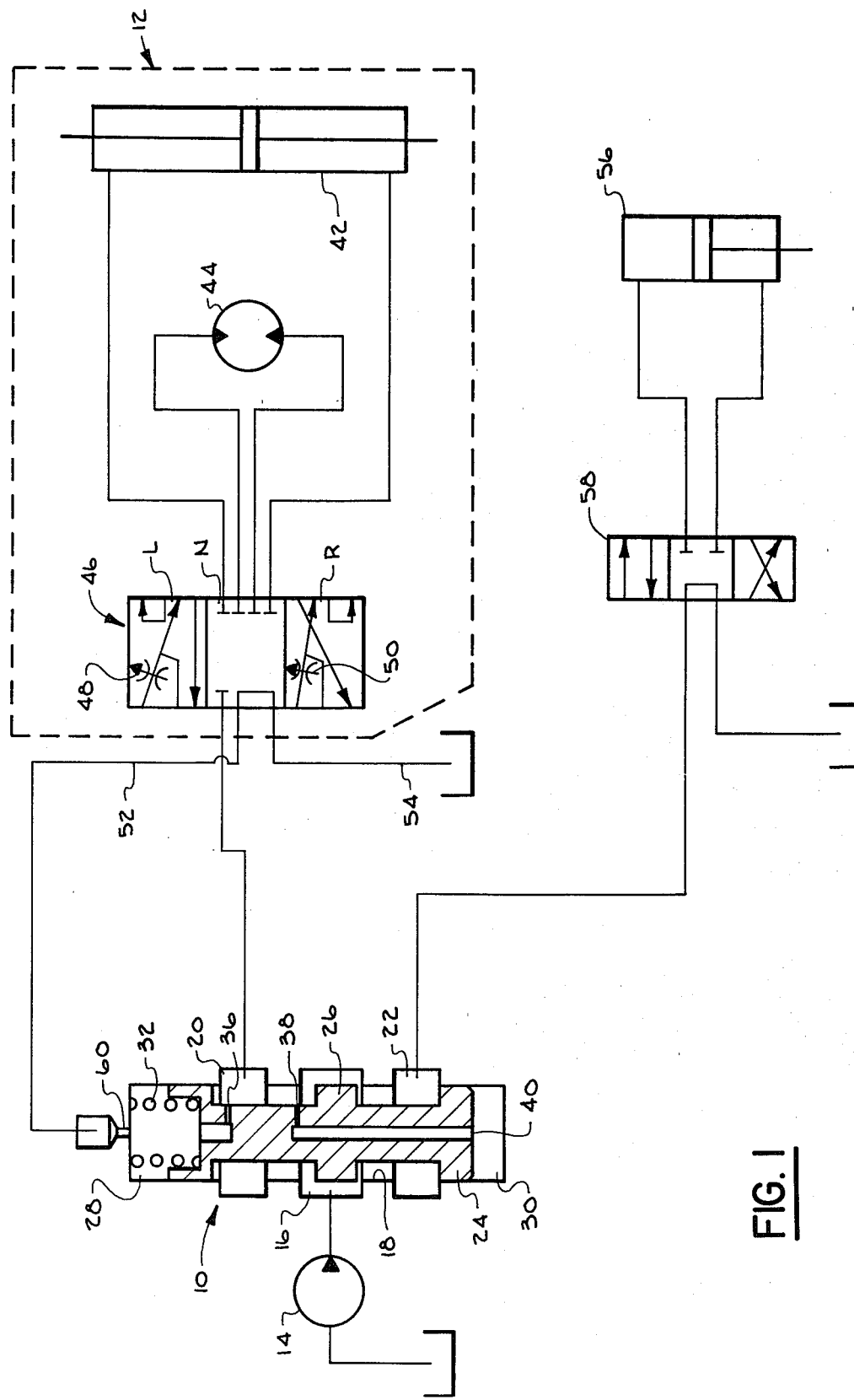
FIG. 1 is a sectional view of the priority flow control valve with the remainder of a fixed displacement open center hydraulic system shown schematically and neutrally positioned.
Figure 3:
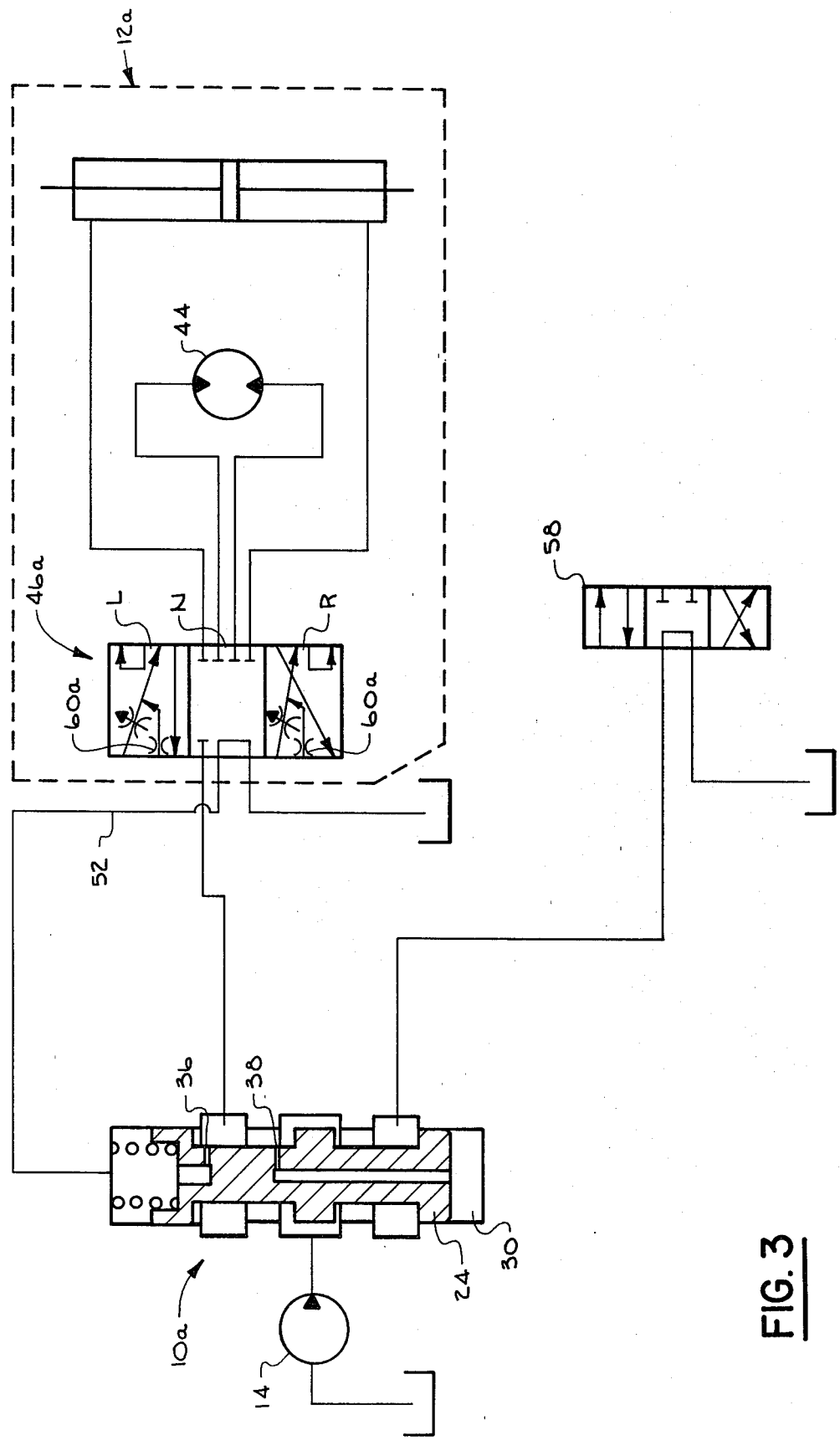
Figure 4:
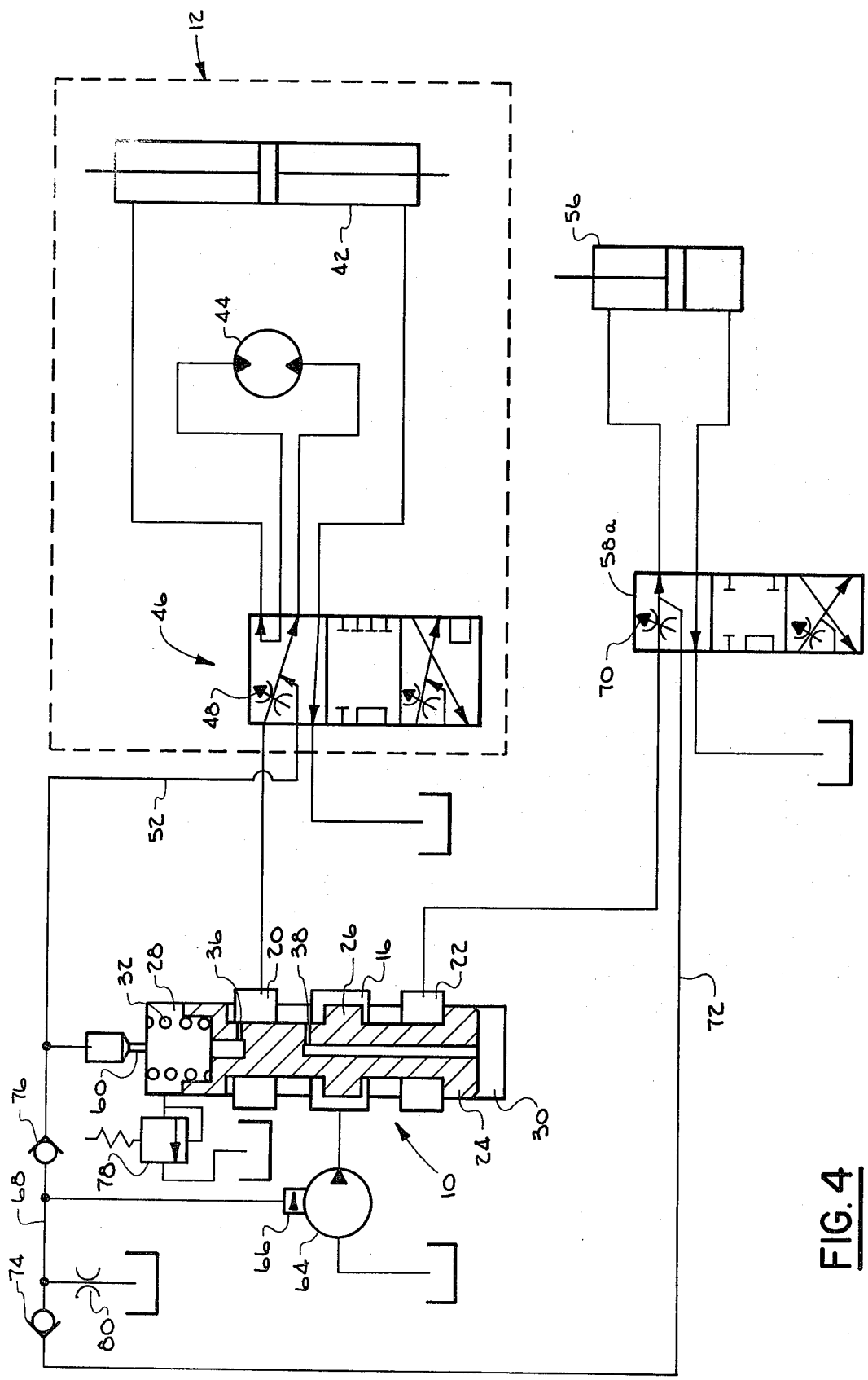

FIG. 3 is a similar view to FIG. 1 except the priority flow valve is shown in a slightly modified form with one of the orifices moved into the turning valve to the steering unit; and FIG. 4 is a similar view to FIG. 1 except the priority flow control valve is utilized in a variable displacement load responsive system with the turning valve of the steering unit in an operative position and the priority motor also in an operative position.

DESCRIPTION OF THE PREFERRED EMBODIMENT

Figure 2:
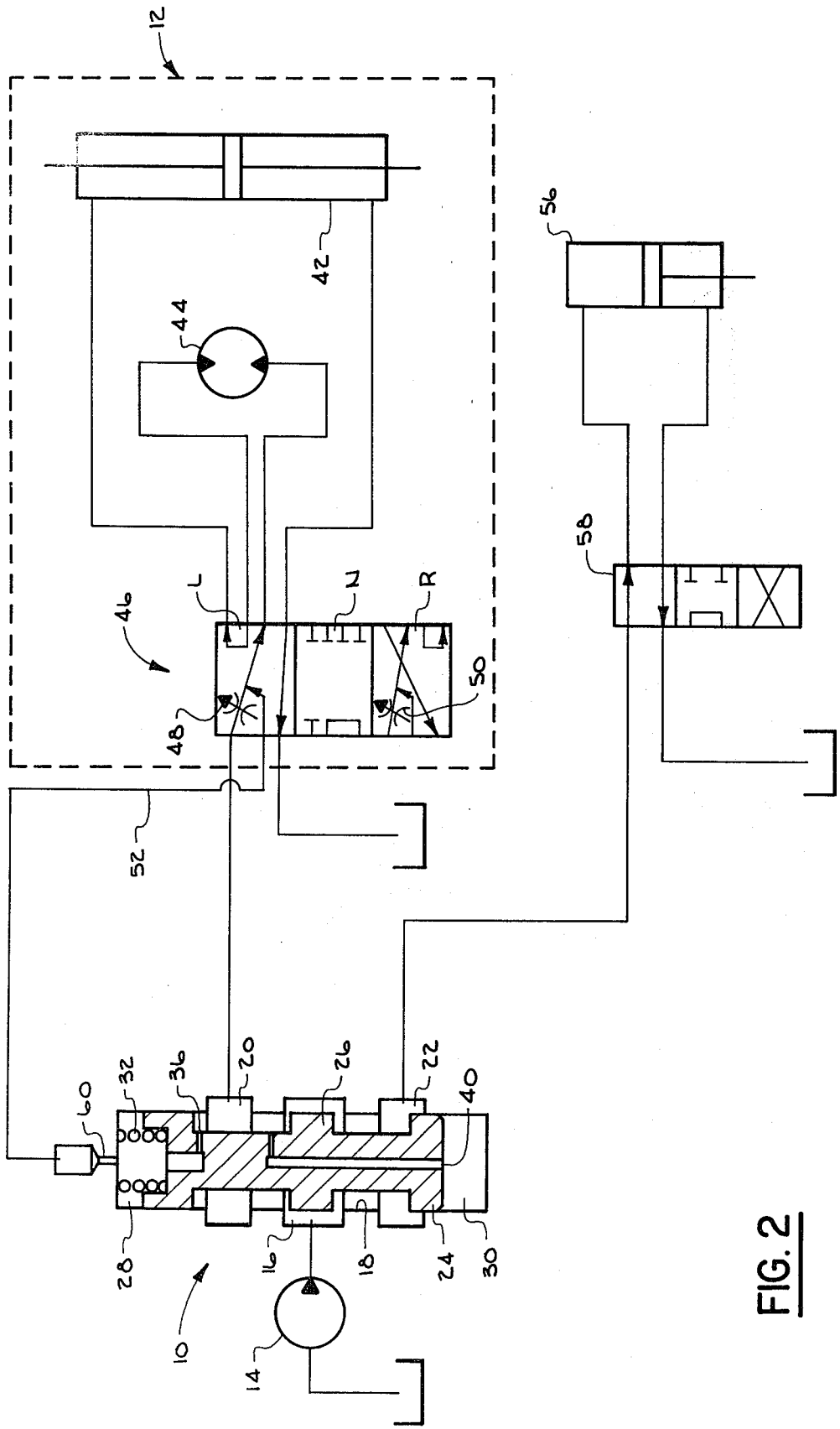
FIG. 2 is a similar view to FIG. 1 with the turning valve of the steering unit in an operative position and the secondary motor in an operative position.

Referring now to the drawings which are not intended to limit the present invention, FIGS. 1, 2 and 3 illustrate the priority valve of the present invention utilized in a fixed displacement system, while FIG. 4 illustrates its use in a load responsive variable displacement closed center system.

As shown in FIG. 1 of the drawing, the priority valve is generally described by reference numeral 10, while the steering unit, which is conventionally known in the prior art, is defined generally by reference numberal 12. A fixed displacement pump 14 supplies pressure to inlet chamber 16. The priority valve 10 includes a longitudinal bore 18 which intercepts priority outlet chamber 20 and secondary outlet chamber 22. Positioned in bore 18 is a valve spool 24 which includes a valving land 26 for valving fluid from one side into priority outlet 20, and valving on the other side of the land into secondary outlet 22. The top end of bore 18 with the end of spool 24 forms a first servo chamber 28 which along with compression spring 32 urges the valve spool 24 in a downwardly direction, as indicated in the drawing. At the bottom end of bore 18 is a second servo chamber 30 acting in opposition to servo chamber 28. Servo chamber 28 is connected to inlet chamber 16 through a small lateral passage or orifice 36 in the side of spool 24. Servo chamber 30 is also connected to pump pressure in inlet chamber 16 through lateral passage 38 in conjunction with longitudinal passage 40.

Powering steering unit 12 is only partially shown since it is well known in the prior art, such as illustrated in U.S. Pat. No. 25,126. Steering unit 12 includes a steering motor 42 connected to the wheels of the vehicle, a fluid meter 44, for measuring the flow rate, and a turning control valve 46 having a right turn position R, a left turn position L and a neutral position N. Located in the left turn position of valve 46 is a variable orifice 48, while variable orifice 50 is located in the right turn position. In the neutral position of valve 46, sensing line 52 is connected to drain through line 54.

Secondary outlet chamber 22 in the priority flow valve 10 supplies a secondary motor 56 through a four-way control valve 58. Servo chamber 28, as illustrated in FIG. 1, is connected to drain through sensing line 52 after flowing across orifice 60. There is a continuous pilot flow across orifices 36 and 60 through chamber 28 to drain 54, under all positions of turning valve 46.

FIG. 3 illustrates a slightly modified form of the invention wherein the second orifice 60a in the logic path is moved from the control valve 10 (orifice 60 in FIG. 1) to the turning control valve 46a in the steering unit. This second orifice now takes the form of orifice 60a located in the right and left turn positions of turning control valve 46a. By removing second orifice 60 from the logic flow path in the neutral position, this permits the neutral pressure drop across the priority valve 10 to be decreased to a very low level on the order of 30 to 35 PSI which substantially reduces the heat loss in a standby condition. This low pressure standby makes the system much more desirable for use with fixed displacement pumps since the neutral pressure losses can be reduced by fifty percent.

OPERATION

When the turning valve 46 of FIG. 2 is moved to its left turn position, as indicated in the drawing, sensing line 52, which was previously connected to drain, is now sensing the downstream pressure from variable restriction 48 as pump pressure beings to flow from priority outlet chamber 20. Since secondary motor 56 requires a higher pressure than steering unit 12, the pump pressure in inlet chamber 16 will rise to whatever level is required to move the motor 56, which for example could be 1500 PSI. Since this pressure level far exceeds the pressure level required to operate steering unit 12, valve spool 24 will restrict the pump flow between inlet chamber 16 and priority chamber 20 to maintain a pressure level in chamber 20 which will achieve the proper steering flow across orifice 48. The accumulated pressure drop in the logic circuit across orifices 36 and 60 will be equal to the pressure drop across variable restriction 48 since they are connected in parallel. Therefore, once the flow across orifice 48 exceeds its optimum, the relative pressure in servo chamber 28 will be diminished, thereby causing spool 24 to shift upwardly with spool land 26 restricting the flow to priority chamber 20 thereby dropping the pressure in chamber 20 until the pressure drop across orifice 48 is returned to its optimum flow condition. If secondary control valve 58 was in its neutral position connecting secondary outlet chamber 22 to drain, spool 24 would not be restricting pump discharge flow in chamber 16 to the priority outlet chamber 20, but rather restricting flow from inlet chamber 16 into outlet chamber 22 so as to maintain a sufficient pressure level to operate the steering unit at the desired flow rate across orifice 48. In such a condition, the bottom edge of valve spool land 26 would shift downward so as to restrict flow into secondary outlet chamber 22 until sufficient pressure was built in inlet chamber 16 to create an optimum pressure drop across variable restriction 48. This optimum pressure drop will always be the accumulated drop across orifices 36 and 60.

In FIG. 4 the priority flow valve 10 is shown in a load sensing system wherein the pump source 64 is a variable displacement pressure flow compensated pump controlled by pump compensator 66. Compensator 66 senses the pressure drop across variable orifice 48 in the steering unit through sensing passage 68 downstream from orifice 60. Compensator 66 also senses the pressure drop across restriction 70 in secondary control valve 58 via sensing line 72. Due to the presence of check valves 74 and 76, sensing lines 72 and 68 are prevented from backflowing into each other. Due to the parallel connection of sensing lines 72 and 68 from their respective variable orifices 70 and 48, compensator 66 will sense the highest signal line pressure and attempt to maintain a pump discharge pressure above that sensing line pressure by a fixed amount. If the pump pressure required to move the secondary motor 56 exceeds the pressure requirements of the steering unit 12, priority flow spool 24 will shift upwardly, so that spool land 26 will restrict the pump discharge pressure in inlet chamber 16 so as to achieve a lower pressure level in priority outlet chamber 20 which will in turn cause the correct flow rate across variable orifice 48 in the steering unit 12. Located in servo chamber 28 is a relief valve 78 which opens to drain when pressure in servo chamber 28 exceeds a preset level which might be caused by the obstruction of flow in the steering circuit. Bleeddown orifice 80 allows the pump 64 to quickly stroke back to standby once the control valves 46 and 58a are neutrally positioned.

The priority flow valve 10 of the present invention has equal utility in other types of power steering systems and hydraulic systems not illustrated.

The drawings and description relate only to the preferred embodiments of the invention. Since changes, some of which have been mentioned, can be made in the structure of these embodiments without departing from the inventive concept, the following claims should provide the sole measure of the scope of the invention.

I claim:

1. In a fluid control system for selectively actuating a conventional power steering unit while supplying secondary motors all from a single pressure source; a conventional power steering unit, including a three-position turning valve means with at least one variable orifice, said valve supplying in a series path a steering motor through a fluid meter, and means coupling the meter to the turning valve to impart a follow-up movement to the turning valve in accordance with manual movement of the meter; the improvement comprising a priority flow valve positioned between the pressure source and the control valve of the steering unit, the priority valve including:

an inlet chamber connected to the pressure source;

a priority outlet chamber connected to the steering unit;

a secondary outlet chamber connected to said secondary motor;

valve spool means positioned by a pair of oppositely-acting control servos, the first servo urging the spool toward a position blocking inlet flow to the secondary outlet while opening inlet flow to the steering unit; and the second servo urging the spool toward a position opening inlet flow to the secondary outlet and blocking inlet flow to the steering unit;

spring means urging said spool means in the same direction as the first servo;

a first sensing passage in the valve connecting the pressure source with the first servo;

a first orifice in the first sensing passage;

a second sensing passage connecting the pressure source with the second servo;

a third sensing passage connecting the first servo to the flow path downstream of the variable orifice in the turning valve, whereby a pilot flow is provided from the pressure source across the first servo under all positions of the steering control valve; and a second orifice in the third sensing passage whereby the combined pressure drops across the first and second orifices is the same as the drop across the variable orifice in the turning valve.

2. In a fluid control system as set forth in claim 1, wherein the third sensing passage passes through the turning valve means which has three positions, right turn, left turn and neutral; in the neutral position of the turning valve, the third sensing line is connected to drain.

3. In a fluid control system as set forth in claim 1, wherein the third sensing passage passes through the turning valve which has three positions, right turn, left turn, and neutral; in the neutral position of the turning valve, the third sensing line is connected to drain and the second orifice is located in the priority flow valve.

4. In a fluid control system as set forth in claim 1, wherein the second orifice is located in the priority flow valve at the upstream end of the third sensing passage.

5. In a fluid control system as set forth in claim 1, wherein the third sensing passage passes through the turning valve and the second orifice is located in the turning valve, said valve has three positions, right turn, left turn and neutral; in the right and left turn positions the flow in the third sensing passage passes through the second orifice; however, in the neutral position the flow in the third sensing passage bypasses the second orifice and connects with drain thereby reducing the pressure level in the neutral standby condition.

6. In a fluid control system as set forth in claim 5, wherein the second orifice is located in both right and left positions of the turning valve.

7. In a fluid control system as set forth in claim 1 which is load-sensing, wherein the pressure source is a variable displacement pressure flow compensated pump controlled by a compensator further including a fourth sensing passage connecting the pump compensator with the third sensing passage so that the pressure drop across the steering unit can be communicated to the pump compensator.

8. In a fluid control system as set forth in claim 1, wherein the first orifice is larger than the second orifice and including a pressure relief valve connecting the first servo to drain.

9. In a fluid control system as set forth in claim 1 which is of an open-center type, wherein the pressure source is a fixed displacement pump.

10. In a fluid control system having a pressure source supplying a conventional power steering unit having a variable orifice supplying a steering motor with priority flow and at least one secondary motor, the improvement comprising a priority flow valve including:

an inlet chamber connected to the pressure source;

a priority outlet chamber connected to the steering unit;

a secondary outlet chamber connected to a secondary motor;

valve spool means;

a pair of control servos oppositely-acting on the valve spool;

spring means urging the spool means in the same direction as said first servo;

a first sensing passage connecting the pressure source with the first servo a first orifice in the first sensing passage;

a second sensing passage connecting the pressure source with the second servo; and a third sensing passage connecting the first servo to the power steering flow path downstream of the variable orifice whereby a pilot flow is provided from the pressure source across the first servo under all conditions of the steering unit.

* * * * *